United States Patent [19]

Schubert et al.

[11] 4,134,148

[45] Jan. 9, 1979

[54] ELECTRICAL CONTROL AND SERVICE UNIT

[75] Inventors: Hans-Joachim Schubert, Moers; Eckart Schunk, Düsseldorf; Horst Rossbach, Alpen, all of Germany

[73] Assignee: Demag, A.G., Duisburg, Germany

[21] Appl. No.: 797,044

[22] Filed: May 16, 1977

Related U.S. Application Data

[63] Continuation of Ser. No. 653,751, Jan. 30, 1976, and a continuation of Ser. No. 494,059, Aug. 2, 1974, abandoned.

[30] Foreign Application Priority Data

Aug. 9, 1973 [DE] Fed. Rep. of Germany ... 7329113[U]

[51] Int. Cl.² .......................................... H02B 1/04
[52] U.S. Cl. .................................. 361/334; 361/380; 361/428
[58] Field of Search .................. 52/27, 220, 221, 479, 52/480, 508; 339/21; 128/1 R; 174/48, 52 R, 15 R, 16 R; 312/DIG. 15, DIG. 24, 209, 223, 236, 257 A, 257 SK; 361/331, 332, 334, 335, 358, 360, 380, 390, 428

[56] References Cited

U.S. PATENT DOCUMENTS

| 2,871,457 | 1/1959 | Jencks | 339/75 |
| 3,762,398 | 10/1973 | Schefke | 128/2 R |
| 3,832,605 | 8/1974 | Clark, Jr. | 317/120 |
| 3,851,226 | 11/1974 | Chen | 317/120 |

Primary Examiner—Gerald P. Tolin
Attorney, Agent, or Firm—Mandeville and Schweitzer

[57] ABSTRACT

A switchboard booth structure having a unique arrangement of exteriorly accessible service and control devices and interiorly accessible switch devices for controlling low voltage elements of electrical apparatus, particularly metallurgic electric furnaces is disclosed herein.

2 Claims, 1 Drawing Figure

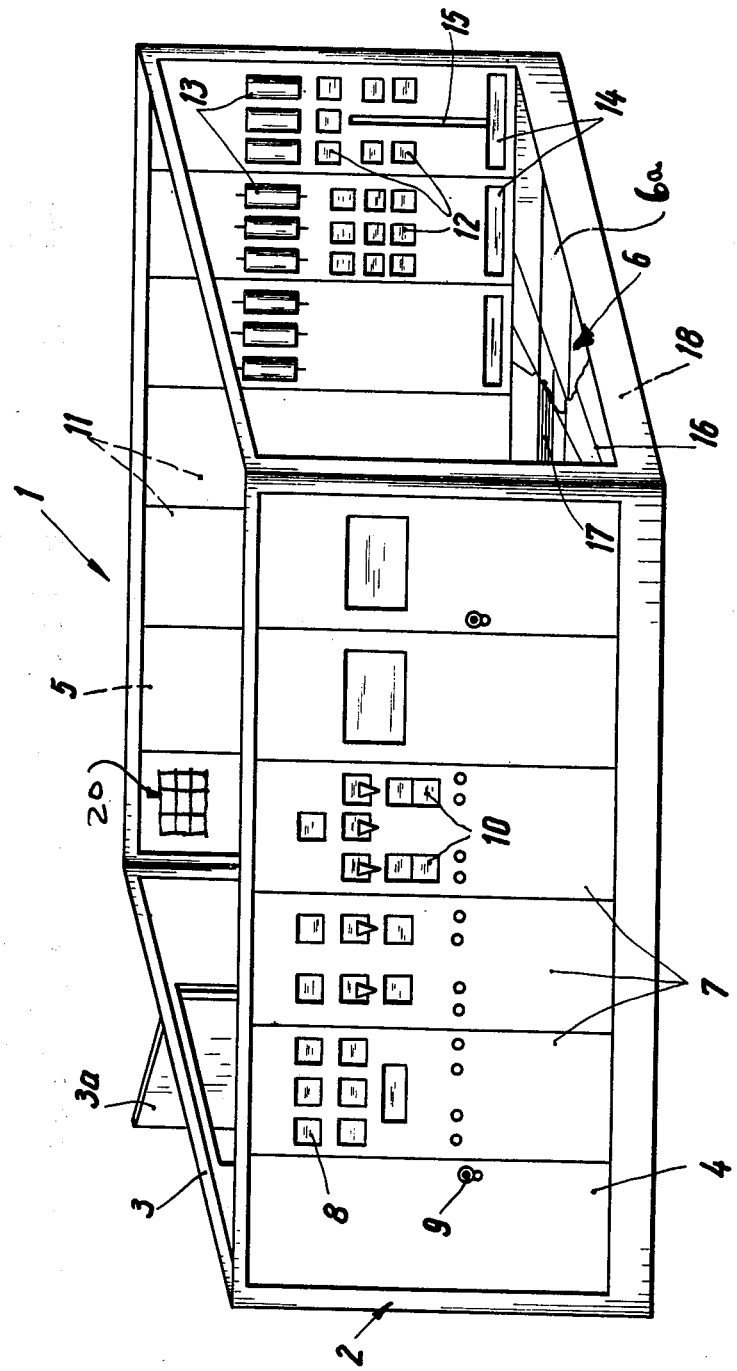

ELECTRICAL CONTROL AND SERVICE UNIT

This is a continuation of application Ser. No. 653,751, filed January 30, 1976 and 494,059, August 2, 1974, now abandoned.

BACKGROUND AND SUMMARY OF THE PRESENT INVENTION

The present invention relates to an arrangement of service and control devices on one wall of a switchboard, constructed as a booth or small room, and the arrangement of switch devices on an opposite wall of the booth. The new switchboard booth is especially well adapted for low voltage elements of electrical apparatus or plants, particularly metallurgic electric furnaces.

Conventional arrangements of this type ordinarily comprise independent switchboards or switch frames which house service and control devices as well as switch devices. Larger electrical units require several of these switchboards, which are interconnected by means of cables. This results in substantial expenditure of time and labor during assembly and erection. Furthermore, these cable connections tend to be complex and hence difficult to service and to maintain. Moreover, exterior cables present a potential source of disturbance and constitute a safety hazard.

Therefore, it is an object of the present invention to improve the arrangement and design of this type of equipment in order to obtain a compact, simple, safe, easily serviced, and easily maintained switchboard unit. According to the present invention, this is uniquely accomplished by arranging all of the service and all of the control devices in an exteriorly accessible wall of a booth in an area forming an accessible portion of a board, while arranging switch devices on the opposite side of this area, which switch devices are accessible from the interior, and by interconnecting the service and control devices with the switch devices by means of wires and cables. Advantageously, the switchboard booth is provided with an intermediate floor, comprising readily removable treads, under which wires and cables are located. Moreover, the side walls of the switchboard booth are comprised of individual modular panels, each of which contains a specific group of service, control or switch devices. If desired, and in order to create a dust-free atmosphere within the enclosed space of the switchboard booth, it may be ventilated with build-in ventilators equipped with suitable dust filters.

For a more complete understanding of the present invention and for a greater appreciation of its attendant advantages, reference should be made to the following detailed description thereof, taken in conjunction with the accompanying drawing.

DESCRIPTION OF THE DRAWING

The drawing illustrates a perspective view of a switchboard booth embodying the principles of the invention, in which drawing ceiling and side wall portions have been removed for purposes of clarity.

DETAILED DESCRIPTION OF THE PRESENT INVENTION

Referring now to the drawing, the new switchboard booth 1 is parallelepiped including a skeletal frame 2, side walls 3 (the righthand side wall being deleted), a front wall 4, a rear wall 5, a floor 6, as well as a ceiling (not shown in the drawing). The side wall 3 includes an access door 3a. As will be understood by those skilled in the art, the booth 1 may be developed as a self-supporting structure without a skeletal frame 2, if desired or deemed necessary. Individual wall panels 7 are accommodated in the front side of the booth to define the wall 4, in which front wall control devices 8, 10 and service devices 9 are mounted for access from the outside and front of the switchboard booth 1. The booth rear wall 5 is comprised of single panels 11, which, in accordance with the invention, mount switch devices 12, fuses 13 and terminals 14. The circuit wiring in each panel 11 leads to a vertical cable duct 15, thence to terminals 14 from which the wiring of devices 12, 13 is connected with appropriately related devices 8, 9 and 10 by wires 16 and cables 17, which are located in the hollow space 18 provided beneath an intermediate floor 6, comprised of readily removable treads 6a.

The important advantage of this new and improved switchboard booth 1 of the invention is that all devices, wiring and accessories are housed in a single closed space which is easily and readily accessible for service, repair and possible alterations, yet which devices, wiring, and accessories do not pose safety hazards or other possible disturbances in surrounding areas. By separating the groups of devices in panels and their comprehensible arrangement, disturbances may be pinpointed expeditiously. Repairs are simplified since all devices and wires are directly accessible.

Those wall panels not in use at the time of the original installation may be comprised of simple flat sheet metal. Subsequently, as in the expansion, for example, of steel mill operations, additional control devices 8, 10, service devices 9, and/or switch devices 12, fuses 13, terminals 14, etc., may be added to the walls 4 and 5, respectively. As will be understood, it is feasible to install illuminated switch panels, and/or an emergency current supply providing emergency or standby current to selected, critical areas of the booth. Also, if desired, a ventilator device 20 having dust filtering means may be incorporated directly into one of the rear wall panels 5, or it may be installed directly in the ceiling, front wall, or side wall panels, if desired.

It should be understood that the switchboard booth apparatus herein illustrated and described is intended to be representative only, as certain changes may be made therein without departing from the teachings of the disclosure. Accordingly, reference should be made to the following appended claims in determining the full scope of the invention.

We claim:

1. A control and service unit for controlling a plurality of separate apparatuses and simultaneously protecting the operators thereof, and having two pairs of opposed spaced-apart walls, a ceiling and a floor forming an enclosed accessible service area, characterized by
   (a) one of said walls comprising a plurality of panels, with each said panel containing a plurality of service and control devices for connection to one of said apparatuses;
   (b) each of said service and control devices being accessible outside said unit for easy connection to and control of its respective separate apparatus;
   (c) a second of said walls comprising a plurality of panels, with each of said panels containing fuse and switch devices for the operation of the service and control devices on one said panel in said one wall;

(d) flow communication means interconnecting the related service and control means on each panel of said one wall with its respective fuse and switch devices on the related panel of said second wall;
(e) said service and control devices of said one wall and the related said switch and fuse devices of said second wall being accessible to said enclosed service area;
(f) said enclosed service area being a walk-in service area for protection of personnel therein; and
(g) said flow communication means being disposed beneath said floor to avoid exposure in said enclosed service area.

2. The apparatus of claim 1, further characterized by
(a) said floor being spaced above the lowermost edge of said walls to define an open space for said flow communication means; and
(b) said floor being comprised of removable panels for gaining access to said flow communication means.

* * * * *